(12) United States Patent
Marcou et al.

(10) Patent No.: US 6,333,461 B1
(45) Date of Patent: Dec. 25, 2001

(54) ELECTRICAL WIRING TRUNKING WITH FLEXIBLE HINGE

(75) Inventors: Jean-Claude Marcou, Limoges; Christophe Albert, Pont Sainte Maxence, both of (FR); Vincent Bonnassieux, Mystic, CT (US)

(73) Assignee: Planet Wattohm, Senlis (FR)

( * ) Notice: Subject to any disclaimer, the term of this patent is extended or adjusted under 35 U.S.C. 154(b) by 0 days.

(21) Appl. No.: 09/456,308

(22) Filed: Dec. 8, 1999

(30) Foreign Application Priority Data

Sep. 24, 1999 (FR) .................................................. 99 11953

(51) Int. Cl.[7] ....................................................... H02G 3/00
(52) U.S. Cl. ............................................................ 174/68.3
(58) Field of Search .............................. 174/68.3, 72 C, 174/72 R, 95, 97, 101

(56) References Cited

U.S. PATENT DOCUMENTS

| | | | |
|---|---|---|---|
| 4,907,767 | * | 3/1990 | Corsi et al. ........................... 174/101 |
| 4,942,271 | * | 7/1990 | Corsi et al. ........................... 174/101 |
| 5,235,136 | | 8/1993 | Santucci et al. ..................... 174/68.3 |
| 5,668,351 | * | 9/1997 | Hanlon et al. ....................... 174/68.3 |
| 5,702,740 | * | 12/1997 | Wild ....................................... 426/87 |
| 5,728,976 | | 3/1998 | Santucci et al. ..................... 174/135 |
| 6,107,576 | * | 8/2000 | Morton et al. ....................... 174/101 |

FOREIGN PATENT DOCUMENTS

| | | |
|---|---|---|
| 29507233 | 10/1995 | (DE) . |
| 0526024 | 2/1993 | (EP) . |
| 0809338 | 11/1997 | (EP) . |

* cited by examiner

Primary Examiner—Dean A. Reichard
Assistant Examiner—Adolfo Nino
(74) Attorney, Agent, or Firm—Browdy and Neimark

(57) ABSTRACT

Electrical wiring trunking with a flexible hinge is reinforced to prevent impacts causing accidental opening of the cover section. The base section and the cover section are attached laterally by a hinge in the form of a flexible strip and respectively comprise a groove and a rib in the vicinity of the hinge and establishing a stiffening structure around the flexible strip when the cover section is closed.

13 Claims, 3 Drawing Sheets

ELECTRICAL WIRING TRUNKING WITH FLEXIBLE HINGE

BACKGROUND OF THE INVENTION

1. Field of the Invention

The invention relates to electrical wiring trunking with a flexible hinge, mainly comprising two sections, namely a base section which usually has a U-shaped profile and a cover section shaped to be forcibly nested with the base section; it relates more particularly to an improvement relating to a flexible longitudinal hinge connecting the cover section to a lateral wall of the base section.

2. Description of the Prior Art

U.S. Pat. No. 5,235,136 describes wiring trunking of the above kind in which the hinge is formed by thinning the material extending longitudinally on one side between the part forming the base section and the part forming the cover section.

The longitudinal edges of the base section and the cover section opposite the hinge have forcible nesting means exploiting the relative flexibility of the material, which is generally a semirigid plastics material. The hinge area is relatively deformable, however, and the closed trunking may accidentally open due to a frontal impact on the cover section or a lateral impact on the wall of the base section that incorporates the hinge.

To remedy this drawback, the above prior art document provides a reinforcement inside the base section consisting of a longitudinal flange adjoining the wall of the base section that incorporates the hinge. This complicates extruding the sections constituting the trunking and limits the space available for wiring within the trunking. The invention overcomes these drawbacks.

SUMMARY OF THE INVENTION

To be more precise, the invention concerns electrical wiring trunking including a base section, preferably with a globally U-shaped profile, a cover section shaped to forcibly nest with the base section and attached laterally to the base section by a longitudinal hinge defined by a flexible and relatively deformable strip, and a rib member and a groove member in the vicinity of the hinge and on respective opposite sides of the longitudinal direction of the strip, wherein one of said members is on the base section, the other of said members is on the cover section, and the rib member engages in the groove member when the cover section is closed to establish a stiffener structure around the flexible strip.

The rib member and the groove member can advantageously be shaped to provide a stable open or at least partly open position of the cover section relative to the base section. This stable position is assured by contact or a buttress effect between an edge of the rib member and an edge of the groove member, for example, operative for a given position of the cover section and which can be forcibly overcome to close the trunking completely, exploiting the relative flexibility of the hinge.

The hinge can be coextruded with the cover section and the base section. It is made from a different and more flexible material, for example, or even a slightly elastic material, for example using the coextrusion process well known in the art.

In a simpler embodiment, which is currently a preferred embodiment, the hinge can consist of an attached adhesive tape.

The invention will be more clearly understood and other advantages of the invention will become more clearly apparent from the following description of various embodiments of electrical wiring trunking in accordance with the invention given by way of example only and with reference to the accompanying drawings.

DETAILED DESCRIPTION OF THE PREFERRED EMBODIMENTS

Figure 1:
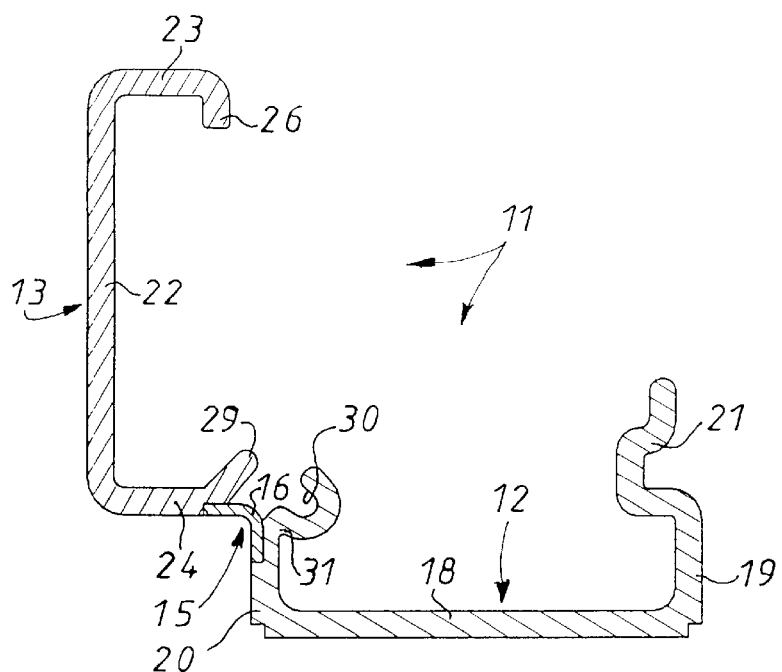
FIG. 1 is a view in cross section of a first embodiment of wiring trunking with the cover section open.
Figure 2:
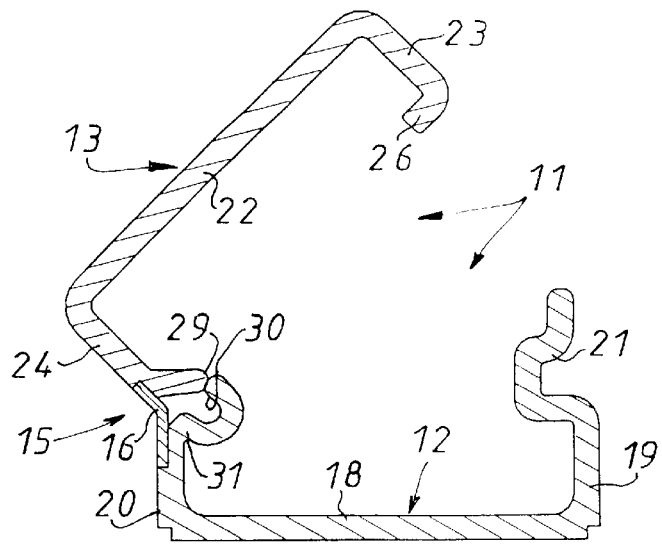
FIG. 2 is a view analogous to FIG. 1 with the cover section partly open in a stable position.
Figure 3:
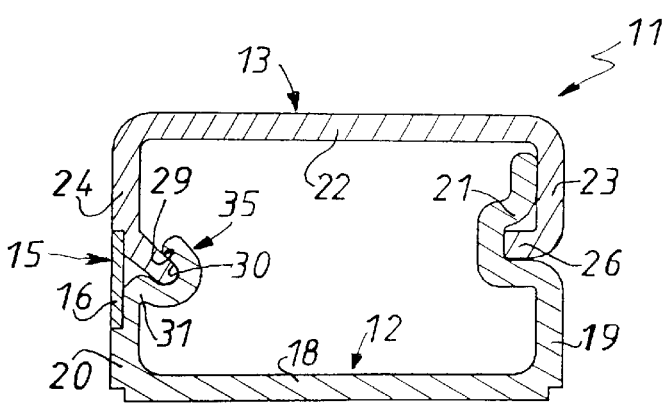
FIG. 3 is a view analogous to FIG. 1 with the cover section closed.

Referring more particularly to FIGS. 1 to 3, electrical wiring trunking 11 mainly comprises a base section 12 with a globally U-shaped profile, a cover section 13 and a longitudinal hinge 15 defined by a flexible and relatively deformable strip 16 between the base section and the cover section. The three members are shown in cross section; they are extruded sections and consequently have a constant cross section. The description of the trunking in cross section is therefore sufficient to characterize it. Here the cover section 13 is globally U-shaped in cross section; it is shaped to nest forcibly with the base section 12.

To be more precise, the base section comprises a plane wall 18 in the form of a strip forming the base of the trunking and extended by two lateral walls 19, 20 which extend longitudinally and are globally perpendicular to the wall 18. The lateral wall 20 is attached to the cover section 13 by the hinge 15 and the opposite lateral wall 19 incorporates a groove 21 opening longitudinally onto its outside face.

The cover section 13 further includes a flat strip 22 extended by two longitudinal lateral walls 23, 24 which are globally perpendicular to the strip 22 and respectively cooperate with the lateral walls 19, 20 of the base section. The lateral wall 23 has a reentrant edge 26 bent at 90° and adapted to engage in the longitudinal groove 21 in the lateral wall 19 of the base section. The longitudinal groove 21 and the reentrant edge 26 form forcible nesting closure means. Forcible nesting is possible in particular because of sufficient flexibility of the lateral wall 19.

The base section and the cover section at least are preferably made from a semirigid plastics material, like most wiring trunking available in the trade, this material lending itself to this type of forcible nesting closure. The flexible strip 16 which constitutes the hinge is made from a material which is more deformable than the base section and the cover section, and even from a slightly elastic material, for example an elastomer material.

However, in this example, the strip 16 constituting the hinge 15 is coextruded at the same time as the base section and the cover section, using a two-material coextrusion process well known in the art. The trunking 11 is therefore formed in a single extrusion operation.

According to an important feature of the invention, the trunking 11 includes a rib 29 and a groove 30 on respective opposite sides of the longitudinal direction of the strip 16 constituting said hinge.

To be more precise, in this example, the rib 29 is part of the cover section and the groove 30 is part of the base section. The opposite configuration is naturally possible.

Be this as it may, when the cover section is closed, the rib 29 engages in the groove 30 to establish a stiffening structure 35 around the flexible strip 16. This can be seen more clearly in FIG. 3, which shows that when the cover section is closed the two lateral walls 19, 20 of the base section and the two lateral walls 23, 24 of the cover section nest within each other so that any forces subsequently applied to the trunking are entirely absorbed by the base section and the cover section, without deformation, the hinge being "backed up" by the stiffening structure 35, which relieves it of all stresses and deformation.

In this example, the rib 29 is a reentrant edge of the cover section 13 and the groove 30 is formed along a reentrant edge of the base section. The reentrant edge of the cover section is at the edge of the lateral wall 24 to which the hinge is connected and the reentrant edge of the base section is at the edge of the lateral wall 20 of the base section to which the same hinge is connected. The two reentrant edges are oriented at substantially 45° toward the inside of the walls which respectively carry them. The groove 30 has a hook-shaped profile open toward the path of movement of the reentrant edge of the cover section when the latter is closed.

FIG. 1 shows the trunking wide open with the cover section and the base section substantially perpendicular to each other.

For a predetermined position of the cover section, shown in FIG. 2, the edge of the rib 29 comes into contact with the edge of the groove 30, which defines a stable position of the cover section 13 relative to the base section 12.

Under these conditions, the trunking can be closed only by lightly forcing the closure beyond this stable position, which results in slight stretching of the material constituting the strip 16 forming the hinge. When this stable partly open position is passed, the forcible nesting closure means 21, 26 on the lateral walls 19, 23 cooperate, thanks to slight flexing of the lateral walls, until the cover section is forcibly nested with the base section, as shown in FIG. 3.

Figure 4:
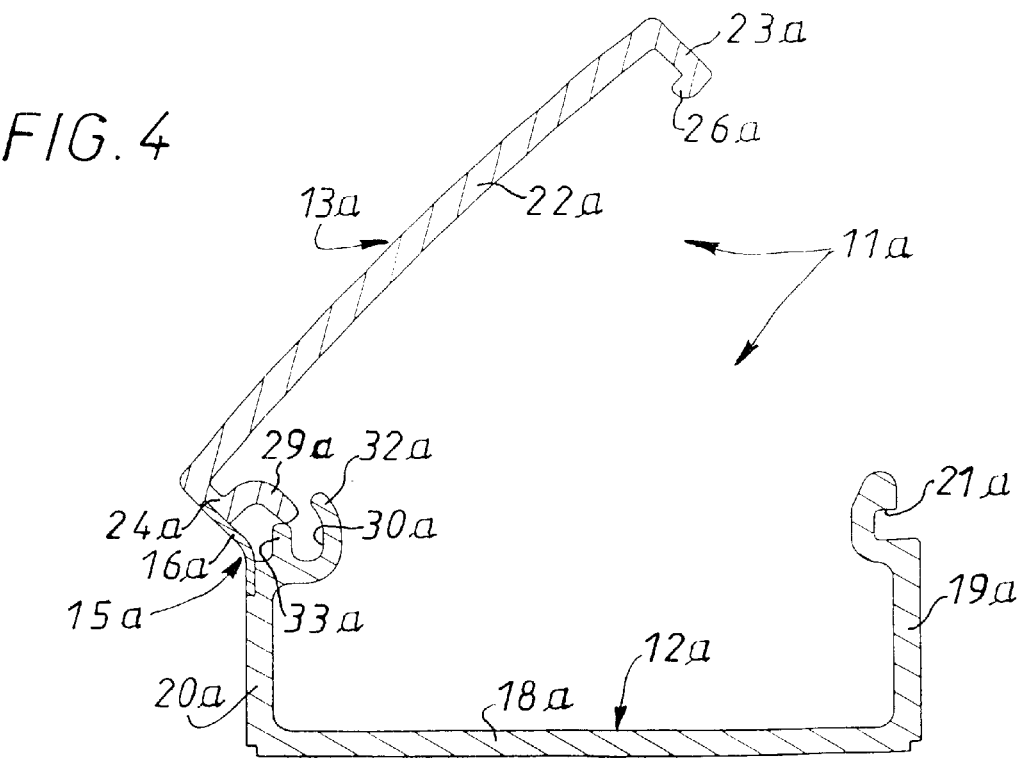
FIG. 4 is a view in cross section of a second embodiment of the invention with the cover section partly open.
Figure 5:
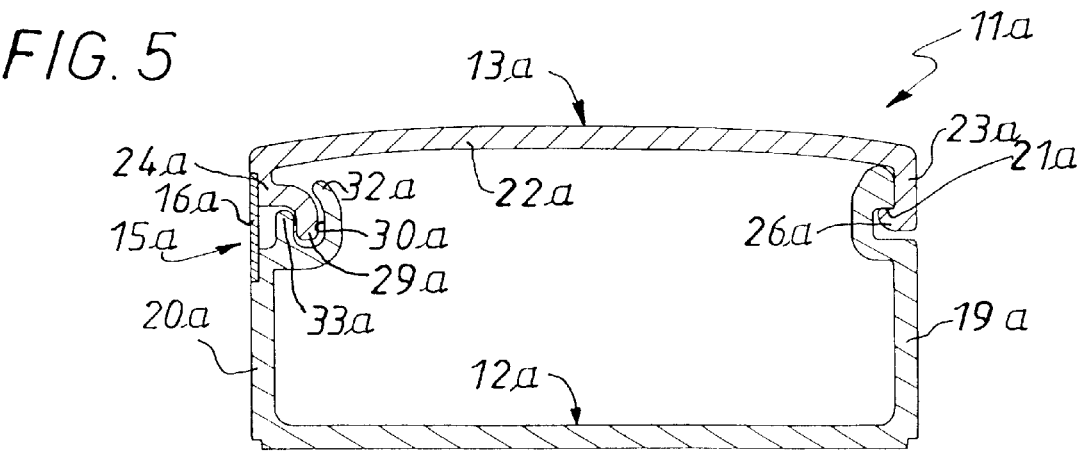
FIG. 5 is a view analogous to FIG. 4 with the cover section closed.

FIGS. 4 and 5 show another embodiment of the invention in which structural components analogous to those of FIGS. 1 to 3 carry the same reference numbers with the suffix a. As previously, the forcible nesting closure means opposite the hinge include a longitudinal groove 21a opening to the outside of the lateral wall of the base section and a reentrant edge 26a (at 90°). The upper edge of the lateral wall 19a and the reentrant edge 26a are rounded to facilitate forcible nesting on closure. On the same side as the strip 16a forming the hinge 15a, the rib 29a on the cover section is a separate part attached to a lateral wall 24a of the cover section substantially perpendicularly thereto (it forms a kind of hook when seen in cross section). It is shaped to engage in a groove 30a with a substantially U-shaped profile attached laterally, here close to its base, to a longitudinal edge of the lateral wall 20a of the base section.

As can be seen in the drawings, the inside flange 32a of the groove is slightly curved toward the outside and the outside flange 33a is lower than the inside flange.

As in the previous example, the hinge is made from a material relatively more flexible than that of the base section and the cover section. The trunking as a whole is made by two-material coextrusion.

As previously, the rib and the groove are shaped to define a stable partly open position of the cover section shown in FIG. 4. In this position, the edge of the rib 29a bears on the edge of the outside flange 33a of the groove. However, if the cover section is forced toward its closed position, slight stretching of the hinge leads to forcible nesting of the rib into the groove in the position shown in FIG. 5.

In this position, the base section 12a and the cover section 13a are rigidly nested on each side of the trunking throughout its length and the hinge 15a is protected from deformation by the cooperation of the rib 29a and the groove 30a.

Figure 6:
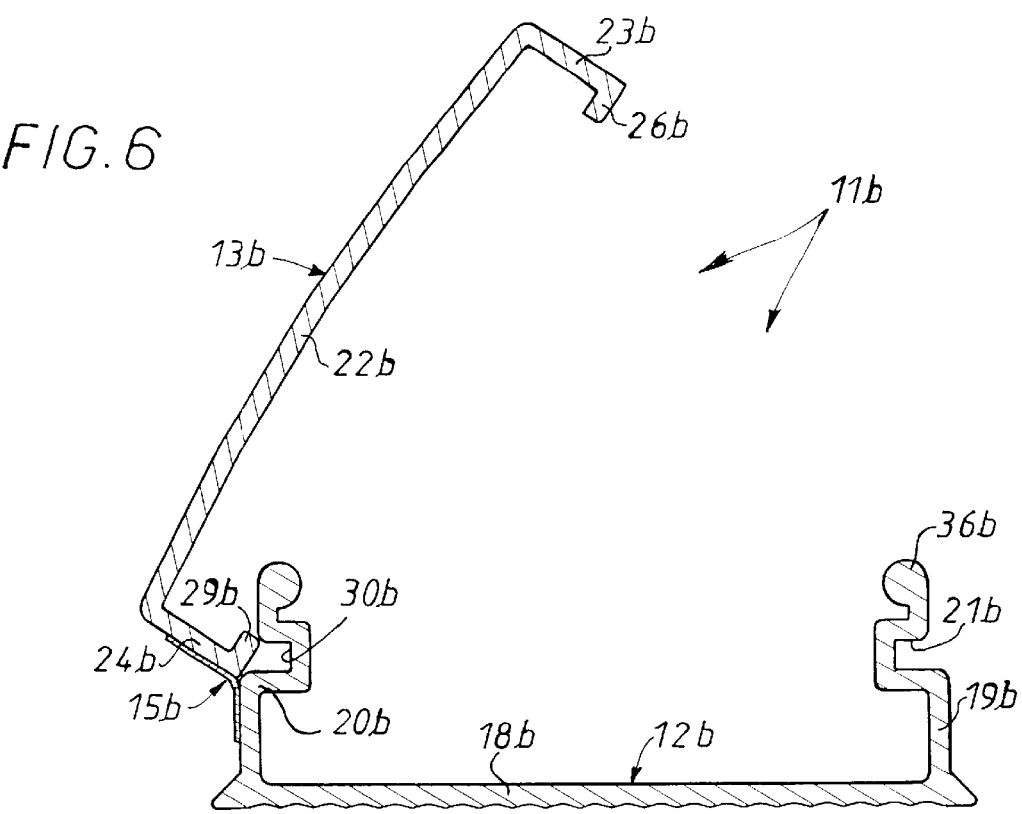
FIG. 6 is a view in cross section of a third embodiment of wiring trunking in accordance with the invention with the cover section partly open.
Figure 7:
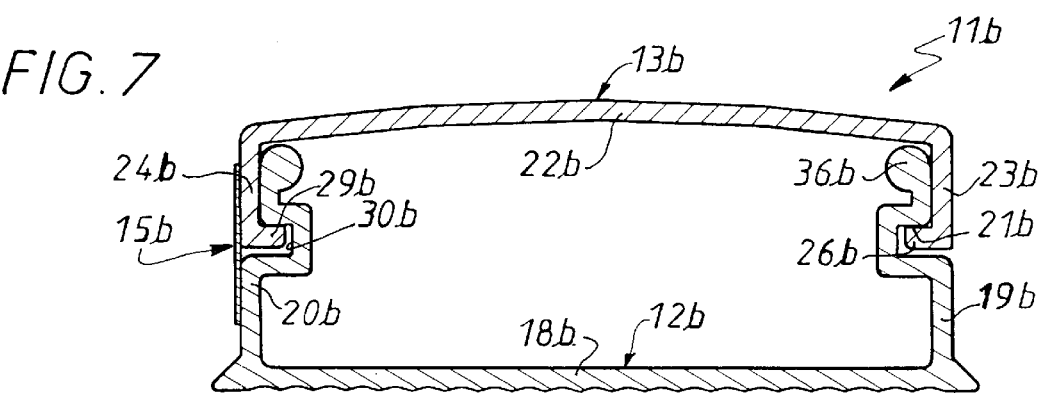
FIG. 7 is a view analogous to FIG. 6 with the cover section closed.

FIGS. 6 and 7 show a further embodiment, which is currently a preferred embodiment, in which analogous structural components carry the same reference numbers with the suffix b. This embodiment therefore includes a base section 12b with a globally U-shaped profile and a cover section 13b also with a globally U-shaped profile.

The base section 12b includes a plane wall 18b in the form of a strip forming the base of the trunking and two lateral walls 19b, 20b extending longitudinally and globally perpendicular to the wall 18b. Similarly, the cover section 13b includes a strip 22b extended by two longitudinal lateral walls 23b, 24b approximately perpendicular to the strip 22b and respectively cooperating with the lateral walls 19b, 20b of the base section.

In this example, the lateral walls 19b, 20b of the base section are similar and symmetrical about a median plane of the trunking. Likewise the lateral walls 23b, 24b of the cover section. In this example, the hinge 15b is attached to the walls 20b, 24b of the base section and the cover section which are aligned with each other on one side of the trunking when the cover section is clipped onto the trunking (see FIG. 7). The hinge 15b is advantageously an adhesive tape.

On the side opposite the hinge, the lateral wall of the trunking includes a longitudinal groove 21b opening onto the outside face of that lateral wall and the edge of the corresponding lateral wall 23b of the cover section includes a reentrant edge 26b at 90° shaped to engage in the longitudinal groove.

The longitudinal groove 21b and the reentrant edge 26b form forcible nesting closure means, thanks in particular to the flexibility of the lateral wall 19b.

The edge of the lateral wall of the base section includes a rounded bead 36b which facilitates forcible nesting of the cover section with the base section.

On the same side as the hinge the arrangement is similar, i.e. the lateral wall includes a groove which constitutes the groove 30b of the stiffening structure and the edge of the lateral wall of the cover section includes a reentrant edge at 90° which constitutes the rib 29b of the stiffener structure. In this embodiment, the stable partly open position of the cover section is obtained when the reentrant edge encounters the lateral wall 20b of the base section in the immediate vicinity of the groove 30b. This is shown in FIG. 6.

By pressing on the cover section to force it toward its completely closed position, the reentrant edge (the rib 29b) is caused to engage in the groove 30b.

Figure 8:
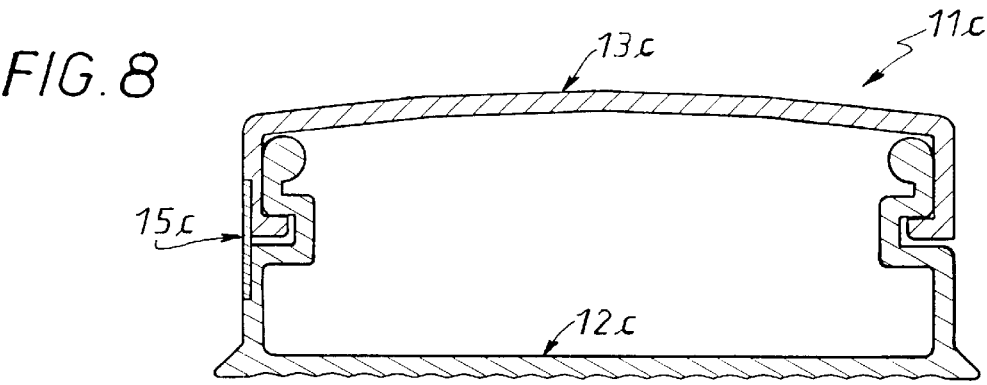
FIG. 8 is a view similar to FIG. 7 of a variant of the trunking of the invention.

In the FIG. 8 variant, the base section 12c, the cover section 13c and the hinge 15c are coextruded, as explained with reference to the previous embodiment.

There is claimed:

1. Electrical wiring trunking including a base section, preferably with a globally U-shaped profile, a cover section shaped to forcibly nest with said base section and attached laterally to said base section by a longitudinal hinge defined by a flexible and relatively deformable strip, said strip extending in a longitudinal direction between said base section and said cover section and being disposed on adjacent external flat portions of lateral walls of said base section and said cover section, and a rib member and a groove member in the vicinity of said hinge and on respective opposite sides of said longitudinal direction of said strip, wherein one of said rib member and said groove member is on said base section, the other of said rib member and said groove member is on said cover section, and said rib member engages in said groove member when said cover section is closed to establish a stiffening structure around said flexible strip.

2. The trunking claimed in claim 1 wherein said rib member is part of said cover section and said groove member is part of said base section.

3. The trunking claimed in claim 2 wherein said rib member constitutes a reentrant edge of said cover section.

4. The trunking claimed in claim 3 wherein said groove member runs along a reentrant edge of said base section.

5. The trunking claimed in claim 4 wherein said reentrant edges are oriented at substantially 45° toward the interior of the walls which respectively carry them.

6. The trunking claimed in claim 2 wherein said rib member of said cover section is a part attached to a wall of said cover section substantially perpendicularly thereto and shaped to engage in said groove member, and wherein said groove member has a substantially U-shaped profile and is attached laterally to a longitudinal edge of said base section.

7. The trunking claimed in claim 6 wherein said rib member has a hook-shaped profile.

8. The trunking claimed in claim 2 wherein said lateral wall of said base section which includes said hinge is globally flexible and incorporates an aforementioned groove opening longitudinally onto the outside face of said lateral wall and said rib member is a reentrant edge of said cover section.

9. The trunking claimed in claim 1 wherein said base section and said cover section are made of semirigid plastics material with elastically flexible walls and said hinge is an elastomer material significantly more flexible than said walls of said base section and said cover section.

10. The trunking claimed in claim 9 wherein said base section, said cover section and said hinge are coextruded.

11. The trunking claimed in claim 9 wherein said hinge is attached to said lateral walls of said base section and said cover section.

12. The trunking claimed in claim 11 wherein said hinge comprises an adhesive tape.

13. The trunking claimed in claim 1 wherein said cover section is movable relative to said base section into an open position in which said rib member is spaced from said groove member.

* * * * *